United States Patent [19]
Noda

[11] Patent Number: 5,515,339
[45] Date of Patent: May 7, 1996

[54] ULTRASONIC TRANSMITTING-RECEIVING APPARATUS

[75] Inventor: Tetsuya Noda, Aichi, Japan

[73] Assignee: Honda Electronic Co., Ltd., Aichi, Japan

[21] Appl. No.: 339,768

[22] Filed: Nov. 15, 1994

[51] Int. Cl.$^6$ ........................................ G01S 15/00
[52] U.S. Cl. ............................... 367/100; 367/903
[58] Field of Search ........................ 367/903, 100, 367/909

[56] References Cited

U.S. PATENT DOCUMENTS 4,490,716  12/1984  Tsuda et al. ............................ 367/909

Primary Examiner—Daniel T. Pihulic
Attorney, Agent, or Firm—Burgess, Ryan & Wayne

[57] ABSTRACT

Intervals of timing pulses generated by a timing pulse generating means are changed by an interval changing means, interference signals from a second vibrator having the same intervals of the timing pulses being eliminated by changing the interval of the timing pulses by the interval changing means.

5 Claims, 3 Drawing Sheets

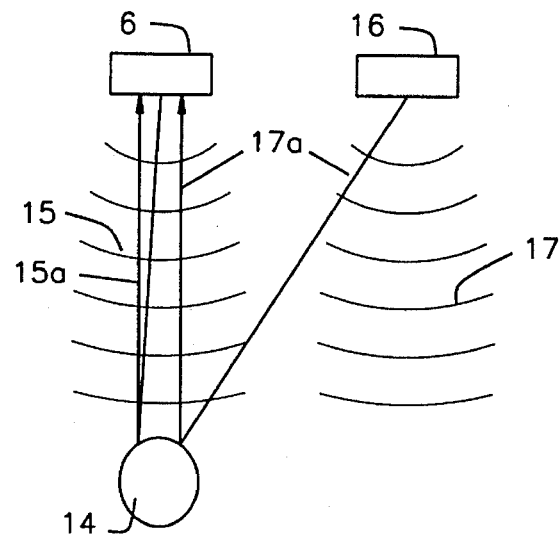
(PRIOR ART)
FIG. 3
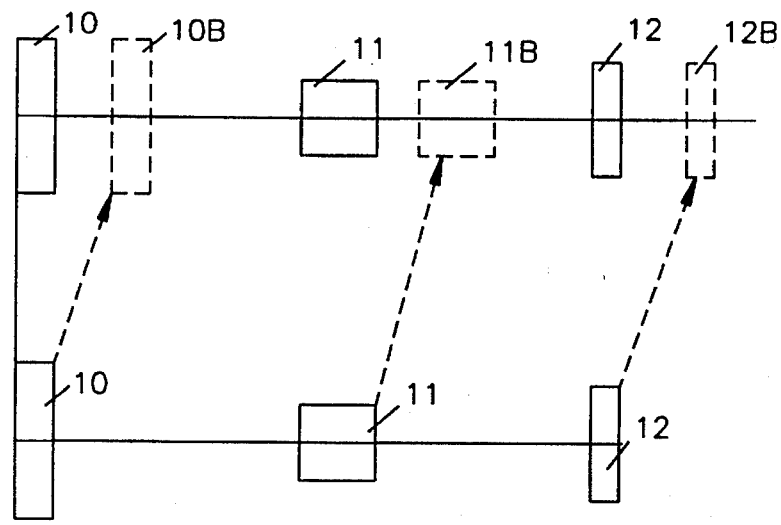
(PRIOR ART)
FIG. 4 (A)
(PRIOR ART)
FIG. 4 (B)

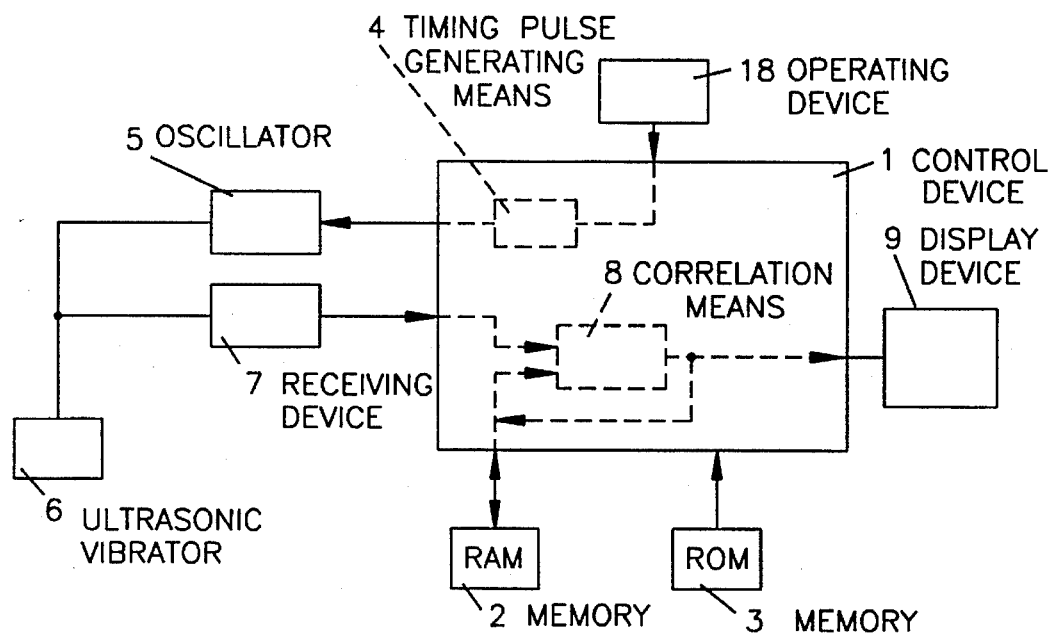
FIG. 5
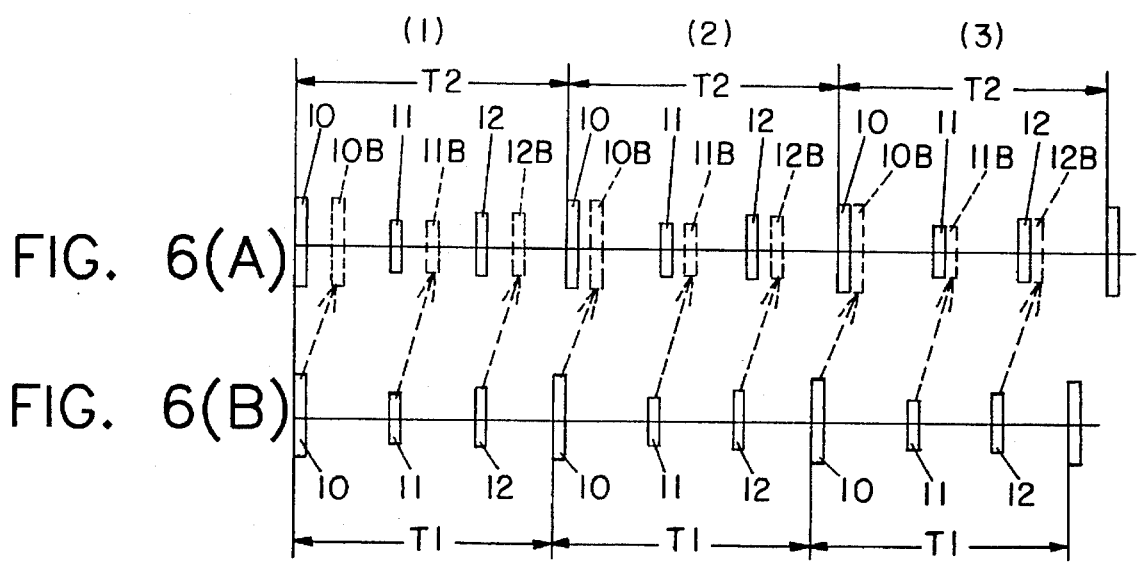
FIG. 6(A)
FIG. 6(B)

ULTRASONIC TRANSMITTING-RECEIVING APPARATUS

BACKGROUND OF THE INVENTION

The present invention relates to an ultrasonic transmitting-receiving apparatus in which ultrasonic echo signals from other transmitting apparatus are eliminated.

In the prior ultrasonic transmitting-receiving apparatus, when a first Liming pulse is transmitted from a timing pulse generating means to an oscillator, a first pulse signal from the oscillator is supplied to an ultrasonic vibrator, a first pulse-like ultrasonic signal is emitted from the ultrasonic vibrator to water, and first pulse signal and first echo signals from an object and the bottom of the sea are successively displayed on a display device. Also, when the next timing pulse is transmitted from the timing pulse generating means to the oscillator, the next transmitting signal and the next echo signals from an object and the bottom of the sea are received through the ultrasonic vibrator by a receiving device. Then, when common signals are selected between the first signals and next signals, even if interference signals are comprised of the first or second signals, the interference signals are removed from the selected signals and the necessary signals are displayed on the display device.

In such ultrasonic transmitting-receiving apparatus, when an object in the water is contacted by ultrasonic wave from the first ultrasonic vibrator and the same object is contacted by ultrasonic signals from the second ultrasonic vibrator having the same timing interval close to the timing interval of the first ultrasonic vibrator, the echo signals due to the ultrasonic wave from the first ultrasonic vibrator and the interference signals from the second ultrasonic vibrator are displayed on the display device.

Therefore, because the necessary signals and the interference signals are supplied to the receiving device of the same timing, when the common signals between the first signals and the second signals are selected, the interference signals cannot be eliminated.

SUMMARY OF THE INVENTION

It is, therefore, the primary object of the present invention to provide an ultrasonic transmitting-receiving apparatus in which the timing, by which interference signals are supplied to a receiving device, is changed by changing the timing intervals in generating the timing pulses.

In order to accomplish the above and other objects the present invention comprises a timing pulse generating means for generating timing pulses, an oscillator for generating pulse signals in response to the timing pulses from the timing pulse generating means, an ultrasonic vibrator for generating pulse-like ultrasonic wave in response to the pulse signals from the oscillator means, for receiving echo ultrasonic wave in water and for changing to echo signals, a receiving device for amplifying the echo signals from the ultrasonic vibrator, a memory means for successively memorizing the echo signals from the receiving device, a correlation means for eliminating different signals between echo signals and the next echo signals, a display device for displaying common signals from the correlation means and an interval changing means for changing timing intervals of the pulses to eliminate the echo readings.

BRIEF DESCRIPTION OF THE DRAWINGS

FIG. 3 is an illustration for explaining the interference between two signals.

FIGS. 4(A) and 4(B) are illustration for explaining an interference between two signals in an ultrasonic transmitting-receiving apparatus of FIG. 1.

FIG. 5 shows a block diagram of an ultrasonic transmitting-receiving apparatus of the present invention.

FIGS. 6(A) and 6(B) show echo signals displayed on a display device of FIG. 5.

DESCRIPTION OF THE PREFERRED EMBODIMENT

Figure 1:
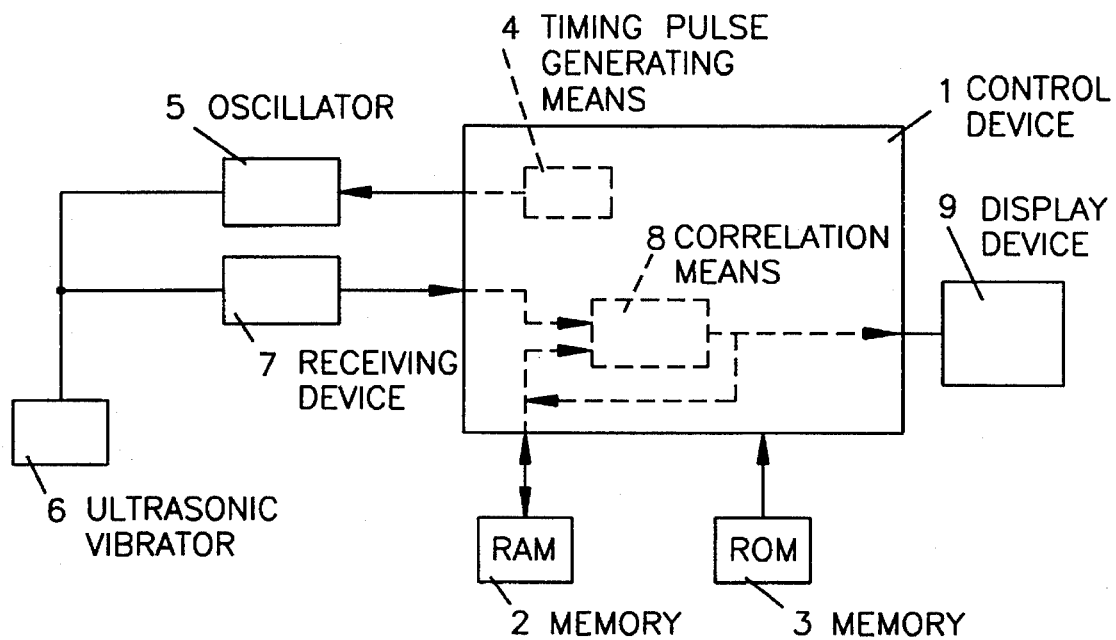
FIG. 1 shows a block diagram of the prior art ultrasonic transmitting-receiving apparatus.

As shown in FIG. 1, in the prior ultrasonic transmitting-receiving, memory means 2 of RAM (random access memory) and memory means 3 of ROM (read only memory) are connected to a control device 1 including a timing pulse generating means 4. An oscillator 5 is connected to the timing pulse generating means 4, and an ultrasonic vibrator 6 is connected to the oscillator 5.

A receiving device 7 comprising an amplifier has an input connected to the ultrasonic vibrator 6, and an output terminal connected to one terminal of a correlation means 8 of the control device 1. The other terminal of the correlation means 8 is connected to a display device 9 and to the random access memory means 2.

In the prior ultrasonic transmitting-receiving apparatus, when one timing pulse from the timing pulse generating means 4 is applied to the oscillator 5, one pulse signal from the oscillator 5 is applied to the ultrasonic vibrator 6 and one pulse-like ultrasonic wave is emitted to the water or the sea. The pulse-like ultrasonic wave is reflected by an object and the bottom of the water or sea and the echo signals reflected by the object and the bottom of the water or the sea are received by the ultrasonic vibrator 6 are amplified in the receiving device 7 and are applied to the correlation means 8.

Figure 2:
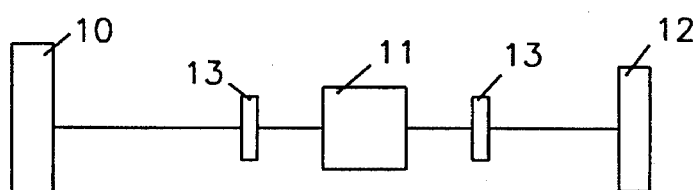
FIGS. 2(A) and 2(B) show echo signals displayed on a display device of FIG. 1.
Figure 2:
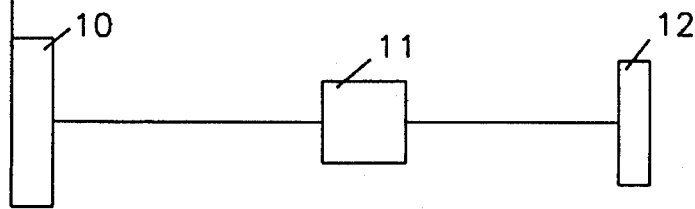

As shown in FIG. 2 (A), when the first echo signals due the to first pulse signal from the oscillator 5 are displayed as the pulse signal 10, the echo signal 11 from the object and the echo signal 12 from the bottom of the water or tile sea on the display device 9 are displayed. Then, as shown in FIG. 2 (B), the pulse signal 10, the echo signal 11 from the object and the echo signal 12 from the bottom of the water or the sea are displayed by the next pulse signal on the display device 9.

Even if interference signals 13 are included in the pulse signals 10 and the echo signals 11 and 12 as shown in FIG. 2 (A), since the interference signals 13 are not included in the echo signals 10, 11 and 12 as shown in FIG. 2 (B), the interference signals 13 are removed from the echo signals by selecting only tile common signals between the two echo signals in the correlation means 8.

As shown in FIG. 3, however, when an object 14 in the water or sea is contacted by an ultrasonic wave 15 from the ultrasonic vibrator 6 and the ultrasonic wave 17 from an ultrasonic vibrator 16 near to the ultrasonic vibrator 6, the ultrasonic wave 17 from ultrasonic vibrator 6 and the ultrasonic wave 17 from the ultrasonic vibrator 16 are reflected by the object 14 and one received by the ultrasonic vibrator 6 as shown by an arrow 15a and an arrow 17a.

Therefore, as shown in FIG. 4 (A), the pulse signal 10, the echo signal 11 from the object 14 and the echo signal 12 from the bottom of the water or the sea are displayed on the display device 9 and the pulse signal 10, tile echo signal 11 from the object 14 and the echo signal 12 from the bottom of the water or the sea as shown in FIG. 4 (B) which are displayed on the display device in the other ultrasonic transmitting-receiving apparatus are displayed on the display device 9 as echo signals 10B, 11B and 12B.

When the generating intervals of the timing pulses from the timing pulse generating means 4 are the same as those of the timing pulses from the timing pulse generating means in the other ultrasonic transmitting-receiving apparatus, since the echo signals 10B, 11B and 12B are generated in the same positions of the echo signals 10, 11 and 12, the echo signals 10B, 11B and 12B cannot be eliminated by selecting coincidence signals between one echo signal and the next echo signal.

FIG. 5 is a block diagram of the embodiment of the present invention, in which 1 designates a control device; 2 a RAM memory; 3; a ROM memory; 4 a timing pulse generating means, 5; an oscillator; 6 an ultrasonic vibrator; 7; a receiving device; 8; a correlation means; 9 a display device; and these components are the same as those of the prior transmitting-receiving apparatus and the explanation of these components are omitted here. In the embodiment of the present invention, the timing pulse generating means 4 has timing interval changing means for changing intervals of the timing pulses and the intervals of the timing pulses in the changing means is changed by an operating device 18.

FIG. 6 (A) is a view displayed on the display device 9 and FIG. 6 (B) is a view of echo signals due to an ultrasonic wave from the other ultrasonic vibrator.

In the transmitting-receiving apparatus of the present invention, when the intervals (T1) of the timing pulses from the timing pulse generating means 4 are the same as those of the timing pulses of the ultrasonic waves from the other ultrasonic vibrator, the signals 10B, 11B and 12B from the other ultrasonic vibrator are inserted into the same positions in the pulse signal 10 and the echo signals 11 and 12 as shown in the dotted lines at time (1) in FIG. 6 (A).

When the intervals generating the timing pulses are changed to become long as shown in times (2) and (3) of FIG. 6 (A), the positions of the signals 10B, 11B and 12B are shifted to the signals 10, 11 and 12. Therefore, while the coincidence signals between the signals 10, 10B, 11, 11B, 12 and 12B in times (1) and (2) of FIG. 6 are detected, the signals 10B, 11B and 12B are eliminated.

The intervals of the timing pulses from the timing pulse generating means 4 can be set to become long or short by the operating device 18 when the interference signals are recognized by the picture on the display device 9.

Also, though the ultrasonic vibrator 6 is used only one for transmitting and receiving in the above embodiment, two ultrasonic vibrators can be used for transmitting and receiving.

In the ultrasonic transmitting-receiving apparatus of the present invention, since many intervals of the timing pulses for generating the ultrasonic waves from the ultrasonic vibrator can be set, the interference signals from a second ultrasonic vibrator located near a first ultrasonic vibrator are completely eliminated.

What is claimed is:

1. An ultrasonic transmitting-receiving apparatus comprising:

timing pulse generating means for generating timing pulses during a plurality of different generating intervals, interval changing means for setting a next generating interval to be different from one generating interval, oscillator means for generating pulse signals in response to the timing pulses from the timing pulse generating means, ultrasonic vibrator means for:

generating one pulse-like ultrasonic wave in response to one pulse signal from the oscillator means during said one generating interval, receiving one echo ultrasonic wave in water in response to said one pulse-like ultrasonic wave generated by said ultrasonic vibrator, generating a next pulse-like ultrasonic wave in response to a next pulse signal from the oscillator means during the next generating interval, receiving a next echo ultrasonic wave in water in response to said next pulse-like ultrasonic wave generated by said ultrasonic vibrator, converting said one echo ultrasonic wave to one echo signal, and converting said next echo ultrasonic wave to a next echo signal, receiving means for amplifying the one echo signal and the next echo signal from the ultrasonic vibrator means, memory means for successively storing the amplified one echo signal and the amplified next echo signal from the receiving means, and correlation means for eliminating different signals between said amplified one echo signal and the amplified next echo signal stored in said memory means.

2. An ultrasonic transmitting-receiving apparatus as set forth in claim 1, further comprising a display device for displaying common signals from the correlation means.

3. An ultrasonic transmitting-receiving apparatus as set forth in claim 1 wherein the interval changing means includes an operating means.

4. An ultrasonic transmitting-receiving apparatus comprising:

timing pulse generating means for generating timing pulses having a plurality of different generating intervals, oscillator means for generating pulse signals in response to the timing pulses from the timing pulse generating means, ultrasonic vibrator means for:

generating a first pulse-like ultrasonic wave in response to a first pulse signal from the oscillator means, receiving a first echo ultrasonic wave in water in response to said first pulse-like ultrasonic wave generated by said ultrasonic vibrator, generating a second pulse-like ultrasonic wave in response to a second pulse signal from the oscillator means, receiving a second echo ultrasonic wave in water in response to said second pulse-like ultrasonic wave generated by said ultrasonic vibrator, converting said first echo ultrasonic wave to a first echo signal, and converting said second echo ultrasonic wave to a second echo signal, receiving means for amplifying the first echo signal and the second echo signal from the ultrasonic vibrator means, memory means for successively storing the amplified first echo signal and the amplified second echo signal from the receiving means, correlation means for eliminating different signals between said amplified first echo signal and the amplified second echo signal stored in said memory means, and interval changing means for setting the generating interval of said second pulse signal different from the generating interval of said first pulse signal so that interfering signals in said first and second intervals having different timings to produce said different signals, and are thereby eliminated by said correlation means.

5. An ultrasonic transmitting-receiving apparatus as set forth in claim 4, further comprising a display device for displaying common signals from the correlation means.

* * * * *